Jan. 27, 1953   A. J. AVETTA ET AL   2,626,701
CONVEYER APPARATUS FOR EVISCERATING SHRIMP
Filed Aug. 1, 1950
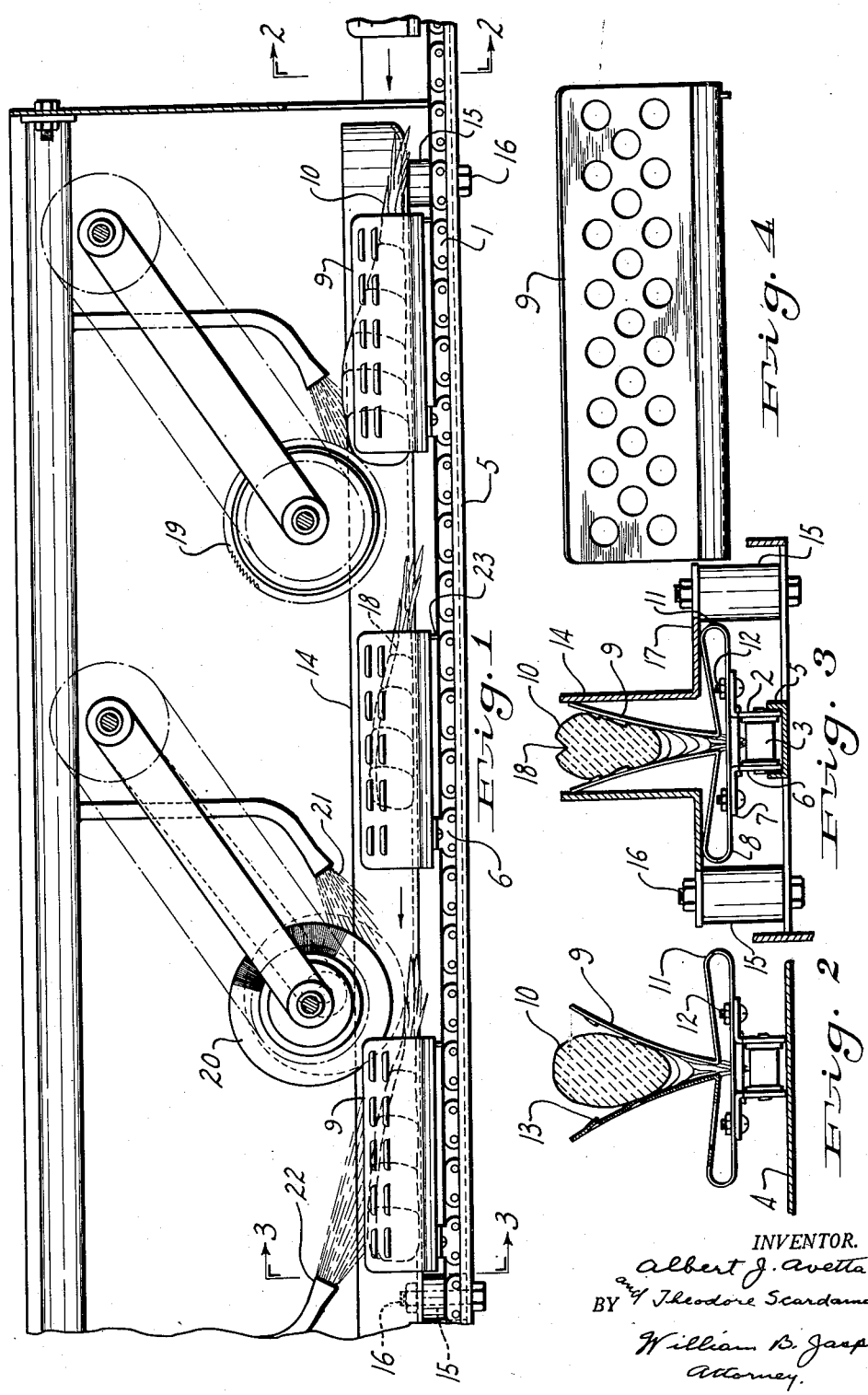
INVENTOR.
Albert J. Avetta
and Theodore Scardamalia
BY
William B. Jaspert.
Attorney.

Patented Jan. 27, 1953

2,626,701

UNITED STATES PATENT OFFICE 2,626,701

CONVEYER APPARATUS FOR EVISCERATING SHRIMP

Albert J. Avetta and Theodore Scardamalia, Pittsburgh, Pa.

Application August 1, 1950, Serial No. 177,018

3 Claims. (Cl. 198—179)

This invention relates to apparatus for deveining shrimp, and it is among the objects thereof to provide improved means for holding the shrimp.

In previous attempts made to eviscerate or devein shrimp by mechanical methods, no particular recognition was given to the problem of holding the body of the shrimp, while most emphasis was placed upon the slitting or cutting of the back of the shrimp. The real solution is not alone in cutting the back of the shrimp in the region of the vein, but to so hold the shrimp that after it is slitted, the cut is spread to expose the vein, which can then be either brushed off or flushed out by water sprays.

The present invention deals with an improvement in the holding mechanism which is more effective in gripping the shrimp body in a manner to lay open the fleshy portion of the shrimp so that all of the vein and loose shell and meat particles resulting from the cutting action are washed away clean.

The invention will become more apparent from a consideration of the accompanying drawing, constituting a part hereof, in which like reference characters designate like parts, and in which:

Fig. 1 is a side elevational view of a shrimp gripping and conveying mechanism embodying the principles of this invention;

Fig. 2 is a cross-sectional view partially in elevation of the shrimp gripping device, taken along the line 2—2, Fig. 1;

Fig. 3 is a similar view taken along the line 3—3, Fig. 1;

Fig. 4 is a side elevational view of one of the gripping flanges.

With reference to the several figures of the drawing, numeral 1 designates an endless conveyor chain, consisting of the usual links 2 and cross pins or rollers 3, which is driven by a motor in the conventional manner with the load bearing strand supported on a flat base 4 or a channel 5 as shown in Figs. 2 and 3, respectively. At spaced intervals on the chain are links 6 having flanges 7 on which are mounted spring gripping means, generally designated by the numeral 8, having flanges 9 which are preferably curved but may be straight and which are of the length to engage the main body portion of a shrimp 10, as shown in Fig. 1 of the drawing. The spring gripping flanges extend to form loops 11 which are bolted to flanges 7 by screws 12, the ends of the loops 11 acting as pivot points which allow downward movement of the pair of gripping flanges 9 as will be hereinafter explained. The gripping flanges 9 are provided with upstruck portions 13, Fig. 2, which, as shown in Fig. 3, grip the body of the shrimp to prevent slippage as it is subjected to the deveining process.

With reference to Figs. 1 and 3, L-shaped guide bars 14, are disposed in the path of movement of the conveyor chain 1 in the region where the shrimp is subjected to the cutting and cleansing action. The guide rails are spaced from the bottom support 4 of the chain by means of rubber washers 15 with bolts 16 that extend through the flanges 17 of the L-shaped guide bars 14. As the flanges 9 of the clamping brackets pass in contact with the guide bars 14, they are subjected to a closing action to grippingly engage the shrimp body 10 and in doing so cause it to move downward by virtue of the pivoting action of the spring clamping members 9 around their loops 11. This movement compresses the lower portion of the shrimp body, as shown by comparison of Figs. 2 and 3 of the drawing, and places the upper surface in tension so that when it is subjected to the slitting action of a saw cut, as designated by the numeral 18, it will be spread open and expose the vein portion of the shrimp.

In Fig. 1 the gripped shrimp is shown passing underneath a saw 19 mounted in a manner to ride over and follow the contour of the shrimp, and after the slitting action the shrimp is either passed under a brush 20 or is merely subject to a washing action by water jets or sprays 21 and 22.

The mounting of the guide bars 14 on the rubber pads or washers 15 gives the bars a resilience allowing adjustment or self-alignment to the shrimp clamping members 9 in accordance with the size of the shrimp body clamped therebetween. The sizes vary over a wide range, for which reason some resilient and adjustable form of shrimp gripping means is preferred.

We have found that by a spring clamping means like the members 9 provided with suitable gripping surfaces, such as the upstruck members 13, a light-weight construction is available at a minimum cost which is sensitive to the resilient guide arms and self-adjusting to various sized shrimp bodies. The spring gripping elements 9 may be made of stainless steel and are practically indestructible as they are not subjected to any appreciable wear except by contact with the guide bars 14 and their flanges 17 which are also made of stainless steel.

The mounting of the gripping members 9 on a special flanged link of the sprocket chain 1 effects a substantial savings in cost of construction, and a chair or stool 23 is provided at the tail end of the gripping member, as shown in Fig. 1, by means of which it simply rests upon the links of the sprocket chain.

It is evident from the foregoing description of the invention that the conforming gripping means for conveying shrimp into deveining mechanism effects a positive and adjustable gripping action to compress the main body of the shrimp while providing surface tension at the top that spreads the shrimp body and shell as it is being cut and maintains it in the spread position for the subsequent flushing out or brushing operation.

Although one embodiment of the invention has been herein illustrated and described, it will be evident to those skilled in the art that various modifications may be made in the details of construction without departing from the principles herein set forth.

We claim:

1. In a device for mechanically deveining shrimp, gripping and conveying means comprising a link conveyor having spring gripping means mounted in axially spaced relation thereon for successively moving the shrimp bodies into and through the deveining mechanism, said spring gripping means comprising a plurality of metal jaws forming a mouth for receiving the shrimp body and terminating in loops to provide a resilient mount for the gripping members, one end of said gripping means being secured to a pair of said conveyor links and the other end having a stool resting upon the conveyor.

2. In a conveying mechanism for deveining shrimp, a conveyor comprising a chain having flanged links spaced at intervals for mounting gripping members, gripping means comprising spring clamps mounted on said flanged conveyor links having a flared mouth for receiving the shrimp bodies and having upstruck portions for grippingly engaging the body of the shrimp, said gripping means having loops forming springs for resiliently mounting the gripping jaws, and means in the path of travel of the conveyor for contacting portions of the gripping jaws to bias them to a closing position, said gripping means having lugs adapted to rest upon the conveyor chain at the ends remote from the flanged mounting links.

3. In a shrimp deveining machine, an endless conveyor, gripping members mounted on said conveyor in spaced relation for holding shrimp while subjected to the deveining operation, said gripping members comprising a plurality of clamping faces for gripping the shrimp body therebetween resiliently mounted on the conveyor chain, and guide arms in the path of travel of the gripping means for engaging the same to thereby hold the shrimp gripping members under tension and force them downward on their resilient mount, said guide arms having resilient supports to accommodate them to different size shrimp.

ALBERT J. AVETTA.
THEODORE SCARDAMALIA.

REFERENCES CITED

The following references are of record in the file of this patent:

UNITED STATES PATENTS

| Number | Name | Date |
|---|---|---|
| 1,103,809 | Mischler | July 14, 1914 |
| 1,357,387 | Donnelly | Nov. 2, 1920 |
| 1,953,300 | Holman | Apr. 3, 1934 |
| 2,299,774 | Weems | Oct. 27, 1942 |